United States Patent [19]

Hamer et al.

[11] 4,336,169
[45] Jun. 22, 1982

[54] UNSATURATED POLYESTER RESINS

[75] Inventors: George D. Hamer; Robert F. Russell, both of Wellingborough, England

[73] Assignee: Scott Bader Company Limited, Northamptonshire, England

[21] Appl. No.: 217,021

[22] Filed: Dec. 16, 1980

[30] Foreign Application Priority Data

Dec. 21, 1979 [GB] United Kingdom ................ 7944073

[51] Int. Cl.³ .................... C08L 67/06; C08L 91/08
[52] U.S. Cl. .................... 523/511; 525/11; 525/48; 523/518
[58] Field of Search .................. 260/28 R, 28.5 R; 525/11, 48, 49

[56] References Cited

U.S. PATENT DOCUMENTS 4,285,845 8/1981 Russell .................... 260/28 R

FOREIGN PATENT DOCUMENTS 713332 8/1954 United Kingdom .
850762 10/1960 United Kingdom .
2011918 7/1979 United Kingdom .

Primary Examiner—Theodore E. Pertilla
Attorney, Agent, or Firm—Pearne, Gordon, Sessions, McCoy & Granger

[57] ABSTRACT

An unsaturated polyester resin composition for ambient temperature open lay-up moulding contains styrene as an agent for cross-linking during curing, a wax for preventing air inhibition and a compound for allowing reduction of styrene evaporation. The compound is of the formula $$R_1-X-CH=CHCOOH$$

where $R_1$ is a straight- or branched-chain substituted or unsubstituted aliphatic $C_6-C_{24}$ hydrocarbon, and $$X \text{ is } -O-\underset{\underset{O}{\|}}{C}-, -\underset{\underset{O}{\|}}{C}-O- \text{ or } -O-.$$

Such resin compositions are particularly suitable for producing laminates and the abovementioned compounds serve as adhesion-promoting agents. Incorporation of such compounds into the compositions enables larger amounts of the waxy substances to be included by compensating for the loss of adhesion which would otherwise have arisen from the presence of larger quantities of waxy substance.

4 Claims, No Drawings

4,336,169

UNSATURATED POLYESTER RESINS

FIELD OF THE INVENTION

The invention relates to unsaturated polyester resins, to methods of making them, and in particular to the reduction of the evaporation of styrene monomer therefrom.

BACKGROUND OF THE INVENTION

It has been known for many years that the inclusion of small quantities of paraffin wax in polyester resins prevents are inhibition of the open surface of mouldings on cure (Brit. Pat. No. 713,332). The wax works by migration to the open surface forming a thin layer which prevents air from interfering with surface cure. The quantity needed depends on the melting point of the wax used, commonly a paraffin, although other waxy materials have been claimed, e.g. stearyl stearate (Brit. Pat. No. 850,762). In practice about 100 ppm. of a paraffin wax mp 52°–54° C. has been employed.

More recently a need has arisen on environmental grounds to reduce the evaporation of styrene monomer from the surface of a laminate in the interval between lay-up and cure. This can be achieved by the incorporation of higher levels of paraffin wax, and the effect of different levels of wax on the styrene loss is progressively greater as the levels of paraffin wax increase up to about 800 ppm. for most types of resin, although some types will require even more wax.

However, at the higher levels of wax required to substantially reduce styrene evaporation several drawbacks have been noted:

(i) the wax can separate from the liquid resin when it is stored at low temperatures,
(ii) the layer of wax can interfere with the adhesion between one layer of laminate and the next, especially where there is a delay between lay-up and cure.

Several methods of overcoming these disadvantages have been proposed i.e. the incorporation of small quantities of a straight chain hydrocarbon, e.g. n-octane, or the use of surfactant such as a polyoxyethylene sorbitan fatty acid ester (German Offenlegungsschrift No. 2554930).

Neither of these methods has been particularly successful. For example 2% n-octane lowers the heat deflection temperature of the cured resin and imparts a milky appearance to the laminate.

It has been proposed (GB No. 2011918A) to use, as adhesion promoting agent, an acyclic, hydrophilic ether or ester, said ether or ester having at least two terminal hydrocarbon groups with at least one double bond in each hydrocarbon group, for example, triethyleneglycol dimethacrylate, an unsaturated, isoprenoidal-compound, for example, dipentene, or an ether or ester of said isoprenoidal compound. It is to be noted that none of the compounds disclosed in GB 2011918A contains a free carboxylic acid group; all of the carboxyl groups of such compounds are esterified. The adhesion promoting agent disclosed in that specification is applied there only to one polyester resin composition.

In our copending European Patent Application No. 79.301587.6 we have described a wide range of unsaturated polyester resin compositions for ambient temperature open lay-up moulding containing styrene as an agent for cross-linking during curing, a wax for preventing air inhibition and, as adhesion promoter, a compound of the formula:

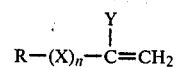

where R is a straight or branched chain aliphatic $C_6$–$C_{24}$ hydrocarbon, n = 0 or 1,

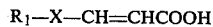

Y = H, $CH_3$.

These resin compositions are designed to allow efficient reduction of styrene evaporation enabling the addition of the larger quantities of paraffin wax or other ingredient which are needed in comparison to the quantities which would have been needed merely for the prevention of air inhibition (air inhibition is an effect of the atmosphere on the surface layer of the laminate so that it does not cure properly), without however, involving the penalty of loss of adhesion or spoiled appearance. They achieve this by promoting inter-laminar adhesion to the extent that they overcome the disadvantages which would otherwise have arisen from the presence of such larger quantities of waxy substance. Furthermore, the presence of such compounds will permit the preservation of the desired heat deflection temperature in the cured resin. The compound is mixed with the conventional components of an unsaturated polyester resin composition (which conventionally consists of a prepolymer plus styrene as a vehicle and cross-linking agent and an accelerator, to which is then added a catalyst when curing is desired), and is theoretically capable of taking part in the cross-linking reaction. The adhesion promoters are applicable to a wide range of polyester resin compositions including those based on isophthalic acid.

SUMMARY OF THE INVENTION

We have now found that certain other compounds containing long chain aliphatic hydrocarbon groups have the same effect. These compounds are of the formula:

$R_1$—X—CH=CHCOOH where $R_1$ is a straight or branched chain aliphatic $C_6$–$C_{24}$ hydrocarbon, and

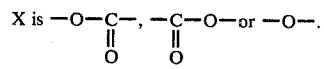

The invention includes the use of those compounds where, by the nature of the alcohols containing the group $R_1$ from which esters or ethers are prepared, the groups $R_1$ have a mixture of chain lengths, and although normally only one such compound will be used in a composition, there is no exclusion of the use of a plurality of such compounds. The group $R_1$ may be saturated or unsaturated and may be unsubstituted or substituted.

Examples of branched-chain hydrocarbons $R_1$ are 2-ethyl-hexyl, tridecane and iso-octadecane and examples of substituents are alkyl, aryl, carboxyalkyl, hydroxyl, alkoxyl, and aroyl groups and halogen atoms (though iodine and bromine would not be desirable substituents—and nor would an amino group).

The styrene used as a vehicle will, in a commercial situation, by styrene itself, but in principle, substituted styrenes may be used.

A preferred hydrocarbon of the group $R_1$ is a $C_{6-18}$ or even $C_{6-24}$ hydrocarbon, $C_{8-22}$, especially $C_{8-18}$, hydrocarbons being more preferred. The hydrocarbon is preferably saturated, but may be unsaturated (e.g. oleyl).

Particularly preferred compounds are monoesters of unsaturated dicarboxylic acids in which $R_1$ is a straight-chain unsubstituted hydrocarbon and

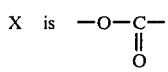

$$X \text{ is } -O-\underset{\underset{O}{\|}}{C}-.$$

Typical examples of suitable compounds are monostearyl maleate, monostearyl fumarate, monolauryl fumarate, hexyl maleate, cetyl maleate and lignoceryl fumarate.

Amounts of 0.1-5% by weight of the said compound can be used, but the preferred range is 0.5-2.5%.

These amounts of component allow the use of quantities of waxy substance much larger than those which would have been needed merely for the prevention of air inhibition and yet such large amounts can be incorporated in the composition without any of the previously mentioned disadvantages associated with these known ingredients. Furthermore, these components can be used with a wide range of polyester resin compositions.

Preferred examples of the waxy substance are paraffin wax and stearyl stearate, but any waxy substance which is sufficiently soluble in the styrenated resin to allow incorporation of the wax into it may be used.

DESCRIPTION OF PREFERRED EMBODIMENTS

The reduction in styrene loss when using a preferred resin composition embodying the invention in laminate formation as compared with that when using a conventional resin composition will now be illustrated with reference to the following Comparative Example and Examples.

COMPARATIVE EXAMPLE

500 Grams Crystic® 406PA (an orthophthalic acid based pre-accelerated general purpose polyester) was mixed with 12 grams methyl ethyl ketone peroxide (BUTANOX® M50) and this was used, in an open lay-up moulding at ambient temperature to make a glass fibre laminate 0.5 sq.m. in area using 1 layer of 450 g/m² glass mat. The styrene loss from the surface of the laminate was 34 g/m² after 30 Minutes.

24 hours later a fourth layer of glass mat was laminated on top of the first using a further 600 g resin plus 12 g catalyst.

When tested after a further period of 24 hours it was very difficult to separate the two layers.

EXAMPLE 1

The same procedure as in the Comparative Example was followed except that the resin was modified by the inclusion of 750 ppm paraffin wax and 0.75% monostearyl maleate. The styrene loss from this laminate was 14 g/m² after 30 minutes.

24 hours later a further layer of glass mat was laminated on top of the first using the same amount of resin.

When tested after a further period of 24 hours it was very difficult to separate the two layers.

EXAMPLE 2

The same procedure as Example 1 was followed except that, instead of the 750 ppm paraffin wax, 1000 ppm stearyl stearate were used and, instead of the 0.75% monostearyl maleate, 0.75% monostearyl fumarate was used. The styrene loss from this laminate was 15 g/m² after 30 minutes and the adhesion was again excellent.

EXAMPLE 3

The same procedure as Example 2 was followed except that, instead of the 500 g Crystic® 406PA, 500 g Crystic® 419PA (an isophthalic acid based resin) were used. The styrene loss from this laminate was 17 g/m² after 30 minutes and the adhesion was again excellent.

What is claimed is:

1. An unsaturated polyester resin composition for ambient temperature open lay-up moulding containing styrene as an agent for cross-linking during curing, a wax for preventing air inhibition and 0.1 to 5% by weight of the composition of at least one compound for allowing reduction of styrene evaporation characterized in that the said compound is of the formula $$R_1-X-CH=CHCOOH$$

where
$R_1$ is selected from the group consisting of straight- and branched-chain substituted and unsubstituted aliphatic $C_6$-$C_{24}$ hydrocarbons and
X is selected from the group consisting of

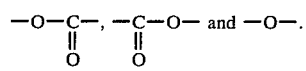

$$-O-\underset{\underset{O}{\|}}{C}-, \; -\underset{\underset{O}{\|}}{C}-O- \text{ and } -O-.$$

2. An unsaturated polyester resin composition according to claim 1, wherein X is

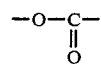

$$-O-\underset{\underset{O}{\|}}{C}-$$

and $R_1$ is a member selected from the group consisting of $C_{12}$ and $C_{18}$ straight chain unsubstituted saturated hydrocarbons.

3. An unsaturated polyester resin composition according to claim 2, wherein the compound is monostearyl maleate.

4. An unsaturated polyester resin composition according to claim 1, wherein the compound is present in an amount of 0.5 to 2.5% by weight of the composition.

* * * * *